May 29, 1956  HENRI-GEORGES DOLL  2,747,402
DIFFERENTIAL PRESSURE WELL LOGGING

Filed Sept. 27, 1951  2 Sheets-Sheet 1

INVENTOR.
HENRI-GEORGES DOLL
BY
Campbell, Brumbaugh, Free & France
ATTORNEYS

May 29, 1956 HENRI-GEORGES DOLL 2,747,402
DIFFERENTIAL PRESSURE WELL LOGGING
Filed Sept. 27, 1951 2 Sheets-Sheet 2

INVENTOR.
HENRI-GEORGES DOLL
BY
Campbell, Brumbaugh, Free & Graves
ATTORNEYS

# United States Patent Office 2,747,402
Patented May 29, 1956

2,747,402

DIFFERENTIAL PRESSURE WELL LOGGING

Henri-Georges Doll, Ridgefield, Conn., assignor to Schlumberger Well Surveying Corporation, Houston, Tex., a corporation of Delaware Application September 27, 1951, Serial No. 248,620

10 Claims. (Cl. 73—152)

The present invention relates to apparatus for logging formations traversed by a borehole, and, more particularly, to differential pressure apparatus for locating permeable formations and for obtaining indications of the fluid pressure of such formations.

In the drilling of oil wells, it is very desirable to ascertain which formations traversed by the borehole are permeable, since the permeability of a formation is directly related to the possible oil or gas productivity of such formation. It is also important to ascertain the pressure of the fluids contained in such permeable formation since the fluid pressure may determine whether a formation is commercially producible.

Accordingly, it is an object of the present invention to provide novel and highly effective apparatus for locating permeable formations traversed by a borehole without regard to the type of drilling liquid or mud employed in the borehole.

A further object of the invention is to provide apparatus for locating extremely thin, permeable formations.

In the usual rotary drilling practice, as a borehole is being drilled into the earth, it is at all times filled with drilling liquid of such weight that the pressure of the column of liquid opposite any formation is greater than the fluid pressure within the formation in order to prevent "blow-outs." Such drilling liquids usually comprise finely divided particles suspended in a liquid base. Since the hydrostatic pressure of the column of drilling liquid at any level is greater than the fluid pressure within formations at the same level, filtrate from the suspension will flow into any permeable formations traversed by the borehole. However, these permeable formations will screen out the particles in the liquid so that a so-called "mud cake" of very low permeability will form on the wall of the borehole at the levels of permeable formations.

Since, in the usual case, the particles in the liquid will not plug permeable formations to any extent, and since the permeability of the mud cake is generally much lower than that of a permeable formation, substantially the entire drop of pressure between the column of liquid in the borehole and the fluid in the permeable formation at the same level appears across the mud cake. Therefore, the pressure at the wall of the borehole immediately beneath the mud cake is substantially the pressure of the fluid throughout the formation. Of course, if a formation is substantially impermeable, there will be no appreciable difference between the pressure at the wall of the borehole opposite such formation and the pressure of the column of liquid in the borehole at substantially the same depth.

In accordance with the present invention, measurements are made, preferably continuously along the borehole, of the differential pressure between a zone adjacent the wall of the borehole, and the column of drilling liquid or mud in the borehole at the same level. When the zone is opposite an impermeable formation, there will be no mud cake on the wall of the borehole and the differential pressure will be zero. If, however, the zone is opposite a permeable formation, a mud cake will be formed which extends out from the wall of the borehole and includes the zone. The mud cake will at least partially isolate the zone from the pressure of the column of drilling liquid; consequently an appreciable differential pressure will exist according to the principles discussed above.

This differential pressure is measured by pressing what is in effect one side of a two-sided pressure-responsive device continuously against the wall of the borehole and penetrating any mud cake sufficiently to render said one side responsive to the fluid pressure of the formations at the wall of the borehole. The other side of the two-sided pressure-responsive device is adapted to be continuously responsive to the hydrostatic pressure of the column of mud at the same level. The difference in pressures between the two sides of the pressure-responsive device is continuously measured as the device is drawn through the borehole. These measurements correlated with the depth of the pressure-responsive deviec in the borehole give indications as to the location of permeable formations. If the first-mentioned side of the pressure-responsive device is maintained against the wall of the borehole in such a manner that no mud cake remains between said side and said wall and no leakage around the device is present, a continuous measurement of the fluid pressure in permeable formations is obtained. However, even though these ideal conditions do not exist, permeable formations will nevertheless be located.

This pressure-responsive device may comprise any one of many types of manometers, such as, for example, a Bourdon tube, an elastic membrane and strain gauge combination, a piezo-electric quartz device, or an ordinary mercury tube. In a preferred form of the invention, however, the pressure-responsive device comprises a permeable diaphragm contained in a tube filled with a uniform electrolyte, that portion of the electrolyte on one side of the diaphragm being subject to substantially only the formation fluid pressure and that portion on the other side being subject to hydrostatic pressure of the column of mud. If a differential pressure exists, the electrolyte flows through the permeable diaphragm and, in accordance with the electrofiltration phenomenon, this flow of electrolyte results in a difference of potential across said diaphragm, which is linearly proportional to the differential pressure. A measurement of this potential difference while the manometer is moved through the borehole gives a direct indication of the differential pressure existing between opposite sides of the permeable diaphragm. Accordingly, a continuous indication of the differential pressure between the formation fluid and the hydrostatic head of the column of mud at the same level is obtained.

The invention will be more fully understood from the following detailed description of several typical embodiments thereof, taken in conjunction with the accompanying drawings in which.

Figures 1, 7:
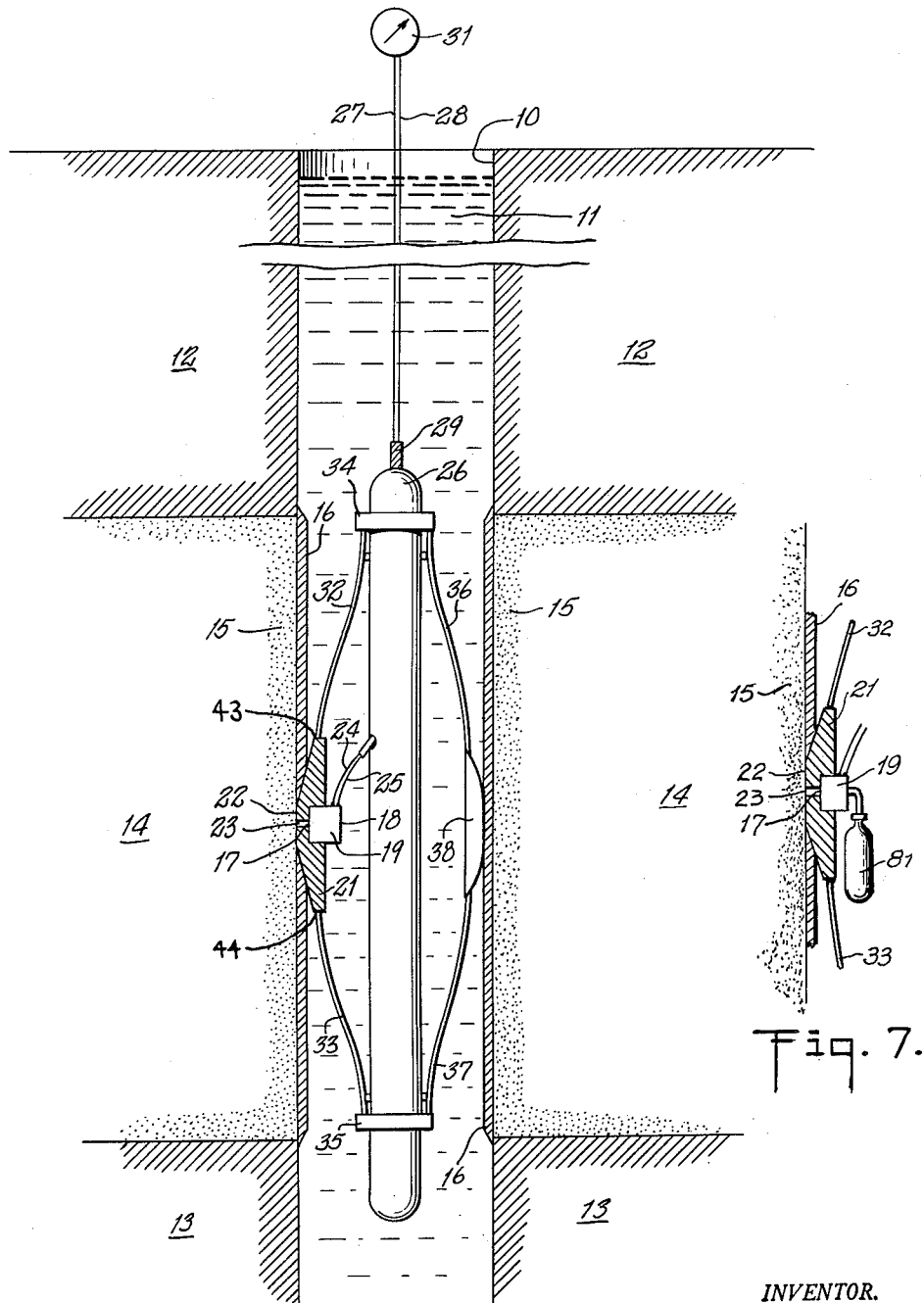
Figure 1 is a schematic diagram, showing one method and apparatus for making differential pressure measurements along a borehole in accordance with the invention.
Fig. 7 is a schematic diagram illustrating a modification of the differential pressure-responsive device shown in Fig. 1.

In Figure 1, a borehole 10, containing a column of drilling liquid or mud 11, having finely divided particles in suspension, traverses a plurality of formations including substantially impermeable formations 12 and 13 and relatively highly permeable formation 14. As discussed above, the hydrostatic pressure of the column of mud 11 in borehole 10 opposite formation 14 is, in good drilling practice, greater than the fluid pressure within permeable formation 14. Thus, filtrate from mud 11 will invade formation 14, as shown in zone 15, thereby forming a mud cake 16 on that section of the wall of the borehole 10 comprising permeable formation 14. In the usual case, the permeability of mud cake 16 will be much lower than the permeability of permeable formation 14 and invaded zone 15. Thus, substantially the full pressure drop between the column of mud in the bore hole and the fluid in formation 14 will exist across mud cake 16. Of course, any type of drilling liquid that seals off permeable formations with an external cake may be employed.

The pressure drop across the mud cake formed on permeable formations is applied between sides 17 and 18 of a manometer 19 which is movable in the borehole 10. Manometer 19 is conveniently carried by a pad 21 having an outer face 22. A port 23 opens from side 17 onto face 22 and provides a passageway which is filled with a substantially incompressible liquid. Pad 21 is forced transversely of borehole 10, causing face 22 to be at least partially buried in any mud cake present on the wall of the borehole. Contact between any mud cake and the face 22 of pad 21 tends to seal port 23 from the main body of liquid in borehole 10. Simultaneously the liquid in port 23 transmits the pressure present beneath the surface of the mud cake adjacent the wall of the borehole 10 to side 17 of manometer 19. Preferably, face 22 penetrates the mud cake and makes actual contact with the wall of the borehole. However, as mentioned above, permeable formations will be located even if side 17 is not strictly responsive to the full pressure of the permeable formations. Side 18 of manometer 19 is subject to the pressure of the column of mud substantially at the same level as port 23.

The manometer 19, which is preferably of the low displacement type, generates an electrical signal responsive to the differential pressure between sides 17 and 18 thereof. This electrical signal is supplied over conductors 24 and 25 to a cylindrical housing 26 wherein the signal may be suitably amplified if desired and transmitted through conductors 27 and 28 contained in supporting cable 29 to an indicator 31 conveniently located at the surface of the earth. Indicator 31 records a quantity representative of the differential pressure applied to manometer 19 as a function of the depth of the same in the borehole in any well known manner.

Face 22 of pad 21 may be forced against the wall of the borehole 10 in any convenient manner. Figure 1 shows, by way of example, leaf springs 32 and 33 which resiliently support the top and bottom ends 43 and 44 of pad 21 and are in turn supported at their extremities by sliding collars 34 and 35, respectively, on housing 26. In order to maintain housing 26 centered in the borehole, leaf springs 36 and 37 are fixed on collars 34 and 35, respectively, diametrically opposite springs 32 and 33, respectively, and force a back-up pad 38 outwardly in a direction just opposite to the force exerted on pad 21. Thus as housing 26 is raised or lowered through the borehole by means of cable 29 and a conventional winch and commutator arrangement (not shown), port 23 in the face 22 of pad 21 is continuously maintained against the wall of the borehole, pressing substantially through any mud cake that may exist thereon.

When pad 21 passes impermeable formation 13 as the housing 26 is being raised through the borehole, substantially no difference in pressure will exist between pressure-responsive sides 17 and 18 of manometer 19. Accordingly, indicator 31 at the surface will give a substantially null reading, and the operator can thus deduce that the formation is in fact impermeable.

When pad 21 cuts through mud cake 16 on passing formation 14 a difference in pressure will arise between sides 17 and 18 of manometer 19, since the pressure drop between the fluid in formation 14 and column of mud at that level appears substantially entirely across low permeability mud cake 16. Indicator 31 will now give a reading dependent on the amount of pressure differential existing between sides 17 and 18, and thus the operator at the surface will be apprised of the fact that the formation is permeable. As the device is raised still further opposite impervious formation 12, again indicator 31 will show a null. By noting the relative depths, the actual vertical extent of permeable formation 14 may be ascertained. If the port 23 is in unobstructed contact with the wall of the borehole and no leakage occurs, the measurement obtained will give direct indications of the differences in pressure between the fluid in permeable formations and the fluid in the borehole at the same levels. However, even if the face 22 does not completely penetrate the mud cake or if some leakage occurs, a differential pressure will nevertheless exist between sides 17 and 18 of manometer 17 since the pressure drop across the mud cake is substantially linear therethrough, and thus permeable formations will still be located.

Figure 2:
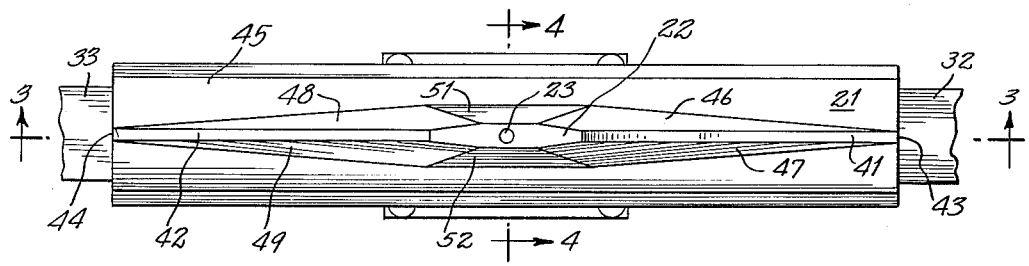
Figure 2 is a plan view of a pad adapted to be pressed against the wall of the borehole and containing one form of differential pressure-responsive device.

Figure 2 shows in detail one form of pad 21, which may be manufactured from hard alloy steel. Port 23 is centrally located in face 22 which is bounded by a plurality of sloping surfaces. Narrow surfaces 41 and 42 slope away from face 22 to ends 43 and 44, respectively, on the base 45 of pad 21 in the direction of the axis of the borehole. Surfaces 46 and 47 slope down from surfaces 41 and one end of face 22 and converge toward end 43, while similar surfaces 48 and 49 descend from surface 42 and the other end of face 22 and converge toward end 44. Intermediate surfaces 51 and 52 intersect surfaces 46, 48 and 47, 49, respectively, and define edges for face 22 that are parallel to the axis of the borehole. With this construction face 22 is broader than surfaces 41 and 42 to ensure an effective pressure seal around port 23.

Figure 3:
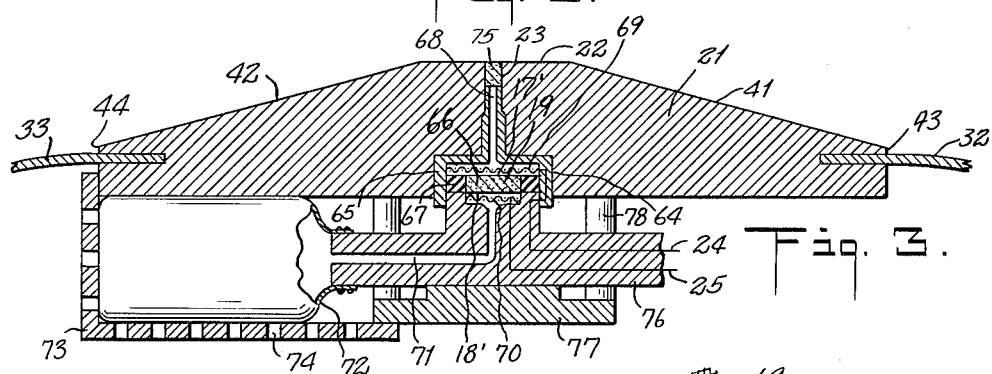
Figure 3 is a longitudinal sectional view of the pad shown in Figure 2 taken along line 3—3 revealing the construction of the differential pressure-responsive device.
Figure 4:
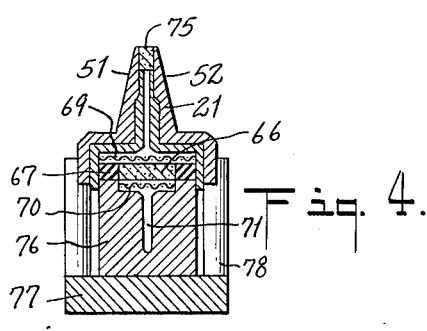
Figure 4 is a transverse sectional view of the pad shown in Figure 2 taken along line 4—4.
Figure 5:
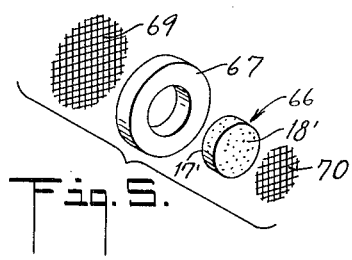
Figure 5 is an exploded view of the essential parts associated with the permeable disc manometer which serves as the differential pressure-responsive device in the structure of Figure 2.

Though any conventional manometer may be employed, an electrofiltration potential measuring device as shown in Figures 3, 4 and 5 is preferred. In order to understand the operation of this manometer a schematic diagram of the essential features thereof is shown in Figure 6.

Figure 6:
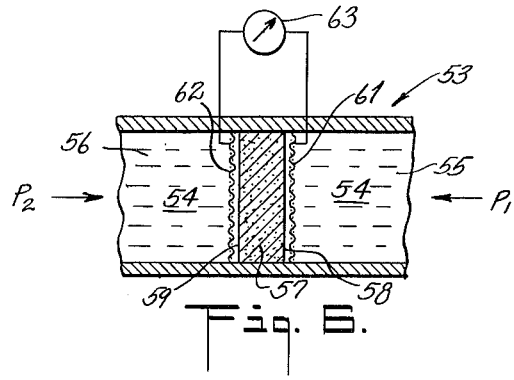
Figure 6 is a schematic diagram used to explain the operation of the manometer shown in Figures 3, 4, and 5.

Figure 6 shows a chamber 53 filled with an electrolyte 54 and having an inner surface that is electrically non-conductive. The chamber 53 is divided into two portions 55 and 56 by a permeable diaphragm 57 which is manufactured from electrically non-conductive material and which isolates the two portions so that the electrolyte can seep through the face of the diaphragm but not therearound. If the pressures of the electrolyte in the two portions 55 and 56 of the chamber 53 differ, a gradual flow of electrolyte takes place in the direction of the lower pressure. This flow gives rise to a difference of electrical potential between the opposite sides 58 and 59 of the permeable diaphragm 57. This potential is caused by an electrofiltration phenomenon and is conveniently called an electrofiltration potential. Where there is a pressure $P_1$ against the side 58 and a different pressure $P_2$ against the side 59, the electrofiltration potential difference is linearly proportional to the difference in pressures $P_1 - P_2$. In order to measure this electrofiltration potential and thus obtain an indication of the differential pressure, electrodes 61 and 62 in the form of electrically conductive screens are placed near, and preferably against, the sides of the permeable diaphragm and a high impedance voltmeter 63 is connected between the electrodes. If desired the meter 63 may be calibrated to read directly in terms of differential pressure.

The permeable diaphragm may be made of non-conductive material such as fritted glass, permeable porcelain or clay. The electrolyte is preferably of low ionic concentration and may be distilled water. The electrodes 61 and 62 may be made of any conductive metal which is not acted upon by the electrolyte.

Referring now to Figures 3, 4 and 5, manometer 19 is constructed in accordance with the above principles and is placed in a recess 64 opening into port 23 in the face 22 of pad 21. If pad 21 is electrically conductive, recess 64 and port 23 are lined with electrically insulating material 65 which also prevents fluid leakage around manometer 19. Manometer 19 comprises a permeable disc 66 set into an insulating washer 67 which may be made of rubber. Against the face 17' of permeable disc 66, which is connected to port 23 by a channel 68 in insulating material 65, is placed an electrically-conductive screen 69 through which liquid may readily pass. Against the other face 18' of disc 66 is placed a similar screen 70. Figure 5 is an expanded drawing of these elements.

Face 18' of disc 66 is connected by a channel 71 to an electrolyte reservoir 72 which supplies electrolyte at the pressure of the column of mud in the borehole at the level of manometer 19. Reservoir 72 may comprise a cylinder containing electrolyte and having a piston exposed to the mud in the borehole. However, in Figure 3 reservoir 72 takes the form of a bladder which is mechanically protected by a shield 73. The shield 73 is perforated by a plurality of vents 74 in order that the pressure of the column of mud may act against the bladder 72 and maintain channel 71 filled with electrolyte at the pressure of the column of mud. The reservoir 72 may be positioned in the housing 26 (Figure 1) but it is preferably positioned on the under side of pad 21.

In the mouth of port 23 is placed a relatively highly permeable plug 75 to prevent the clogging of port 23 with foreign material. Disc 66 must have a much lower permeability than plug 75 in order that substantially all of the pressure drop will be between the wall of the borehole and the column of mud across permeable disc 66. Accordingly, the electrolyte in channel 68 on side 17' of disc 66 is at the pressure of the wall of the borehole and the electrolyte in channel 71 on the other side 18' of the disc 66 is at the pressure of the mud. As mentioned above the mud pressure will be equal to or greater than the pressure at the wall of the borehole and thus any flow of electrolyte will be through plug 75 into the formations, thus tending to keep plug 75 clean. Further, the electrofiltration potential created between the faces 17' and 18' of disc 66, and thus between screens 69 and 70, will be in direct proportion to the differential pressure between the fluid in the formation and the column of mud at the same level.

In order to measure this potential difference insulated conductor 24 is connected to screen 69, and insulated conductor 25 is connected to screen 70. Conductors 24 and 25 are connected through a high impedance circuit either directly or by means of any convenient amplifier or modulator-demodulator arrangement to the indicator 31 at the surface, which preferably makes a log of potential difference with respect to the depth of pad 21 in the borehole.

Conductors 24 and 25, and channel 71 may be contained in insulating material 76 which is pressed against washer 67 and screen 69 to maintain them insulated from the mud in the borehole and to prevent leakage around lining 65. The entire assembly may be held firmly in place by means of a plate 77 screwed into a plurality of posts 78 secured to pad 21.

In operation, as face 22 of pad 21 passes an impermeable formation, no difference of pressure will exist between the wall of the borehole and the column of mud at that level and thus between the electrolyte in channel 68 on side 17' of permeable disc 66 and the electrolyte in channel 71 on side 18' of disc 66. Hence, no electrofiltration potential will be generated across disc 66 and no potential difference will be measured at the surface. The operator will then be informed that such formation is substantially impermeable. If, however, face 22 is pressed against a permeable formation through the mud cake that exists thereon, the pressure of the electrolyte in channel 68 will be substantially at the pressure of the fluid in such formation whereas the pressure of the electrolyte in channel 71 will be maintained at that of the column of mud in the borehole at that level, substantially the entire difference in pressure appearing across permeable disc 66. Accordingly, a potential difference will be indicated at the surface proportional to this pressure differential.

If the pad is properly seated against the formation so that the leakage is small and the residual film of mud cake against the face is negligible, the operator at the surface will be informed of the pressure of the fluid in the formation since it is relatively simple to compute the pressure of the column of mud at a given level. In fact a direct indication of formation pressure may be logged by combining the manometer indication with an indication of mud pressure at the same level, the latter being obtained by an absolute manometer measurement or by a proportional indication obtained from a depth indicator. As noted above, even if pad 21 is not entirely effective in squeezing away the mud cake and sealing against leakage, permeable formations will nevertheless be located as long as the residual mud cake is not too thick nor the leakage too great.

If desired the side 18 of the manometer 19 in Figure 1 may be made responsive to atmospheric pressure as for example by connecting a tank 81 at atmospheric pressure to side 18, as shown in Fig. 7. Under these conditions indicator 31 would register directly the pressure of the fluid in permeable formations.

The measurements of differential pressure may be made simultaneously with other types of logging measurements, or combinations thereof, as, for example, radio-activity and/or electrical logging measurements. Back-up pad 38 may readily be employed to contain electrodes, and thus measurements may be made as described in my co-pending application, Serial No. 122,102, filed October 10, 1951, entitled "Resistivity Methods and Apparatus for Obtaining Indications of Permeable Formations Traversed by a Borehole," now Patent No. 2,669,690, or in my co-pending application Serial No. 214,273, filed March 7, 1951, entitled "Electrical Logging of Earth Formations Traversed by a Borehole," now Patent No. 2,712,629. Also, caliper measurements of the size of the borehole may be made simultaneously as shown, for example, in co-pending application Serial No. 785,270, filed November 12, 1947, by O. H. Huston and entitled "Mutual Impedance Systems," now Patent No. 2,614,164.

Suitable apparatus has been disclosed for carrying out a method of well logging whereby the presence and extent of any mud cake on the wall of the borehole may be measured without regard to whether the drilling liquid is electrically conductive or has an oil base. The construction is essentially rugged and the mode of operation is noncritical.

Since the invention may take forms other than that employed as an illustrative embodiment, the specific apparatus disclosed is not to be regarded as limiting the scope of the appended claims.

I claim:

1. Apparatus for well logging comprising a pad movable in a borehole, a laterally projecting surface portion on said pad delimited by cutting edges, a port in said surface portion, a manometer coupled between said port and the interior of the borehole, and means for forcing said pad against the wall of the borehole to bring at least said surface portion thereof into relatively fluid-tight engagement with the wall of the borehole, whereby the cutting edges cause said surface to penetrate at least partially any mud cake formed on said wall.

2. Apparatus for well logging comprising a pad movable in a borehole, a laterally projecting surface portion on said pad delimited by cutting edges, a port in said surface portion, a manometer coupled between said port and the interior of the borehole, means for forcing said pad against the wall of the borehole to bring at least said surface portion thereof into relatively fluid-tight engagement with the wall of the borehole, whereby the cutting edges cause said surface to penetrate at least partially any mud cake formed on said wall, and means for indicating the response of said manometer as a function of the depth of the same in the borehole.

3. Apparatus for well logging comprising a pad movable in a borehole, a surface portion on said pad carrying a port therein, conduit means communicating at one end with said port and at its other end with a source of electrolyte, a permeable diaphragm mounted in said conduit means so as to block free passage of electrolyte to said port, means for supplying electrolyte to one side of said diaphragm at the pressure of the liquid in the borehole, means for discharging electrolyte from the other side of said diaphragm through the port in said surface portion, means for detecting the potential drop across said diaphragm, and means for pressing said pad against the wall of the borehole to bring at least said surface portion of the pad into relatively fluid-tight engagement with the wall of the well whereby said surface portion is embedded in any mud cake that is present.

4. Apparatus for well logging comprising a pad of non-permeable material movable in a borehole, a laterally projecting surface portion on said pad delimited by cutting edges, a port in said surface portion, a plug of highly permeable material in said port, means for forcing said pad against the wall of the borehole to bring at least said surface portion into substantially fluid-tight engagement with the wall of the borehole, whereby the cutting edges cause said surface to penetrate at least partially any mud cake, a liquid reservoir adjacent said pad, means for gradually discharging liquid from said reservoir through said port and plug, and a manometer coupled to said port.

5. Apparatus for well logging comprising a pad of non-permeable material movable in a borehole, a laterally projecting surface portion on said pad delimited by cutting edges, a port in said surface portion, a plug of highly permeable material in said port, a manometer coupled between said port and a point at a predeterminable pressure, means for forcing said pad against the wall of the borehole to bring at least said surface portion into substantially fluid-tight engagement with the wall of the borehole, whereby the cutting edges cause said surface to penetrate at least partially any mud cake, and means for indicating the response of said manometer as a function of the depth of the same in the borehole.

6. In apparatus for well logging, the combination of a support adapted to be lowered into a well, means carried by said support for isolating a portion of the borehole wall from the pressure of any liquid column in the borehole and for at least partially penetrating any mud cake on the wall of the borehole at a given location in said isolated portion, a differential pressure responsive device carried by said support and responsive both to the fluid pressure at said location and to a reference pressure, and means for exhibiting a function of the response of said device.

7. Apparatus as defined in claim 6 together with means rendering the differential pressure responsive device responsive to a reference pressure which is substantially the same as the fluid pressure exerted by any column of liquid in the borehole in the vicinity of said given location.

8. Apparatus as defined in claim 6 together with means rendering the differential pressure responsive device responsive to a reference pressure which is substantially atmospheric pressure.

9. Apparatus for well logging comprising a pad movable in a borehole, a surface portion on said pad carrying a port therein, a permeable diaphragm carried by said pad, a bladder containing electrolyte and subject to the pressure of the liquid in the borehole for supplying electrolyte to one side of said diaphragm at the pressure of the liquid in the borehole, means for discharging electrolyte from the other side of said diaphragm through the port in said surface portion, means for detecting the potential drop across said diaphragm, and means for pressing said pad against the wall of the borehole whereby said surface portion is embedded in any mud cake that is present.

10. Apparatus for well logging comprising a pad movable in a borehole, a surface portion on said pad carrying a port therein, a permeable diaphragm carried by said pad, means for supplying electrolyte to one side of said diaphragm at the pressure of the liquid in the borehole, a highly permeable plug associated with the port in the surface portion of the pad for discharging electrolyte from the other side of said diaphragm through the port in said surface portion, means for detecting the potential drop across said diaphragm, and means for pressing said pad against the wall of the borehole whereby said surface portion is embedded in any mud cake that is present.

References Cited in the file of this patent

UNITED STATES PATENTS

| | | |
|---|---|---|
| 2,107,006 | Lang | Feb. 1, 1938 |
| 2,334,475 | Claudet | Nov. 16, 1943 |
| 2,400,678 | Archie | May 21, 1946 |
| 2,476,137 | Doll | July 12, 1949 |
| 2,569,625 | Wyllie | Oct. 2, 1951 |
| 2,615,940 | Williams | Oct. 28, 1952 |
| 2,627,183 | Greenwood et al. | Feb. 3, 1953 |
| 2,652,717 | Bush et al. | Sept. 22, 1953 |